United States Patent
Crowthers et al.

(10) Patent No.: US 10,866,809 B2
(45) Date of Patent: Dec. 15, 2020

(54) METHOD, APPARATUS, AND SYSTEM FOR ACCELERATION OF INVERSION OF INJECTIVE OPERATIONS

(71) Applicant: QUALCOMM Incorporated, San Diego, CA (US)

(72) Inventors: Lucas Crowthers, Raleigh, NC (US); John Ingalls, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 78 days.

(21) Appl. No.: 16/027,444

(22) Filed: Jul. 5, 2018

(65) Prior Publication Data
US 2020/0012498 A1  Jan. 9, 2020

(51) Int. Cl.
G06F 9/38 (2018.01)
G06F 9/30 (2018.01)
G06F 12/0875 (2016.01)

(52) U.S. Cl.
CPC .......... *G06F 9/3808* (2013.01); *G06F 9/3001* (2013.01); *G06F 9/30032* (2013.01); *G06F 9/30043* (2013.01); *G06F 9/3861* (2013.01); *G06F 12/0875* (2013.01); *G06F 2212/1021* (2013.01); *G06F 2212/507* (2013.01)

(58) Field of Classification Search
None
See application file for complete search history.

(56) References Cited

U.S. PATENT DOCUMENTS

| | | | | |
|---|---|---|---|---|
| 6,061,749 A * | 5/2000 | Webb | ................... | G06F 9/3879 345/603 |
| 7,234,645 B2 * | 6/2007 | Silverbrook | ............... | B41J 2/14 235/494 |
| 7,768,293 B1 * | 8/2010 | Knapp | .................... | G06F 21/73 326/8 |
| 2006/0007261 A1 * | 1/2006 | Silverbrook | ............... | B41J 2/14 347/19 |
| 2006/0280254 A1 * | 12/2006 | Luby | ...................... | G06F 17/16 375/259 |
| 2008/0130885 A1 * | 6/2008 | Yamamoto | ............... | H04N 5/76 380/201 |
| 2009/0003447 A1 * | 1/2009 | Christoffersen | ..... | H04N 19/192 375/240.16 |
| 2016/0217029 A1 * | 7/2016 | Yoon | ...................... | G06F 21/52 |
| 2019/0004737 A1 * | 1/2019 | Khan | ................... | G06F 3/0604 |
| 2019/0102671 A1 * | 4/2019 | Cohen | ................. | G06K 9/6217 |

FOREIGN PATENT DOCUMENTS

GB        2525264 A      10/2015

OTHER PUBLICATIONS

International Search Report and Written Opinion—PCT/US2019/040136—ISA/EPO—dated Oct. 14, 2019.

* cited by examiner

*Primary Examiner* — Michael Sun
(74) *Attorney, Agent, or Firm* — Edward J. Meisarosh

(57) ABSTRACT

A method of accelerating inversion of injective operations includes identifying a first injective operation, storing information related to the first injective operation, identifying a second operation as an inverse of the first injective operation, and storing information related to the second operation. Accelerated action may be taken based on identifying the second operation as the inverse of the first injective operation, and may including preloading a cache with data and performing operations using data associated with the first injective operation.

22 Claims, 7 Drawing Sheets

METHOD, APPARATUS, AND SYSTEM FOR ACCELERATION OF INVERSION OF INJECTIVE OPERATIONS

BACKGROUND

Field

Aspects of the present disclosure relate generally to injective operations, and more specifically to accelerating the inversion of injective operations.

Background

Computing devices such as processor cores may perform various operation(s) on data that first transform the data, and then at some point later in time reverse the transformation (i.e., perform the inverse operation) to recover the original data. These types of operations, where every distinct input produces only one distinct output, and where the input is fully recoverable when the output corresponding to that input is known, are referred to as injective operations. Particularly in computing devices having multiple processing cores, performing these operations may involve significant power and performance costs as various copies of the data and transformed data are produced, stored in various caches and memories, and transferred across system busses, networks-on-chip, or the like.

Such costs may include both the storage space for redundant copies of the data in various stages of transformation(s) associated with an injective operation, and the power and latency involved with performing the transformation(s) and inverse transformation(s) in one or more processing cores of the computing device. This may be particularly the case where the processing cores that are performing the transformations and inverse transformation(s) are physically co-located and share a cache memory in which at least some of the data may be stored. In such cases, the shared cache memory may contain redundant copies of the data, which reduces the performance of the computing device (since cache lines that could otherwise store other data are wasted by storing redundant copies of data that already exists in the cache in another cache line). Further, in this case, the computing device may continue to send the data and/or transformed data over a system bus or network-on-chip to a main memory, and then retrieve the same data again, further degrading performance of the computing device.

It would thus be desirable to track such transformations when they occur and provide an indication to physically co-located cores that are processing known or predicted inverse transformations that the data for those respective transformations already exists.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method includes identifying a first injective operation and storing information related to the first injective operation. The method further includes identifying a second operation as an inverse of the first injective operation, and storing information related to the second injective operation. The method may further include taking an accelerated action based on identifying the second operation as an inverse of the first injective operation.

In another aspect, an apparatus includes a processing core and a cache memory coupled to the processing core. The processing core further includes a qualifying instruction identifier configured to identify injective operations and inverse operations, and a relationship tracking block configured to store information related to an identified operation. The cache memory further includes a transaction remapping table configured to store information related to identified operations and a transaction tracking table configured to identify and associate pairs of injective operations and inverse operations.

In yet another aspect, an apparatus includes mean for processing and means for caching coupled to the means for processing. The means for processing further includes means for identifying a qualifying instruction configured to identify injective operations and inverse operations and means for tracking relationship information configured to store information related to an identified operation. The means for caching data further includes means for storing transaction remapping information configured to store information related to identified operations and means for storing transaction tracking information configured to identify and associate pairs of injective operations and inverse operations.

One advantage of one or more disclosed aspects is that the disclosed aspects allow data previously generated by a set of injective operations to be used directly, instead of performing the inverse operations to generate that same data. In some aspects, this may conserve power, bus bandwidth, and cache lines, and may allow for increased performance of the computing device.

DETAILED DESCRIPTION

Aspects of the inventive teachings herein are disclosed in the following description and related drawings directed to specific aspects. Alternate aspects may be devised without departing from the scope of the inventive concepts herein. Additionally, well-known elements of the environment may not be described in detail or may be omitted so as not to obscure the relevant details of the inventive teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
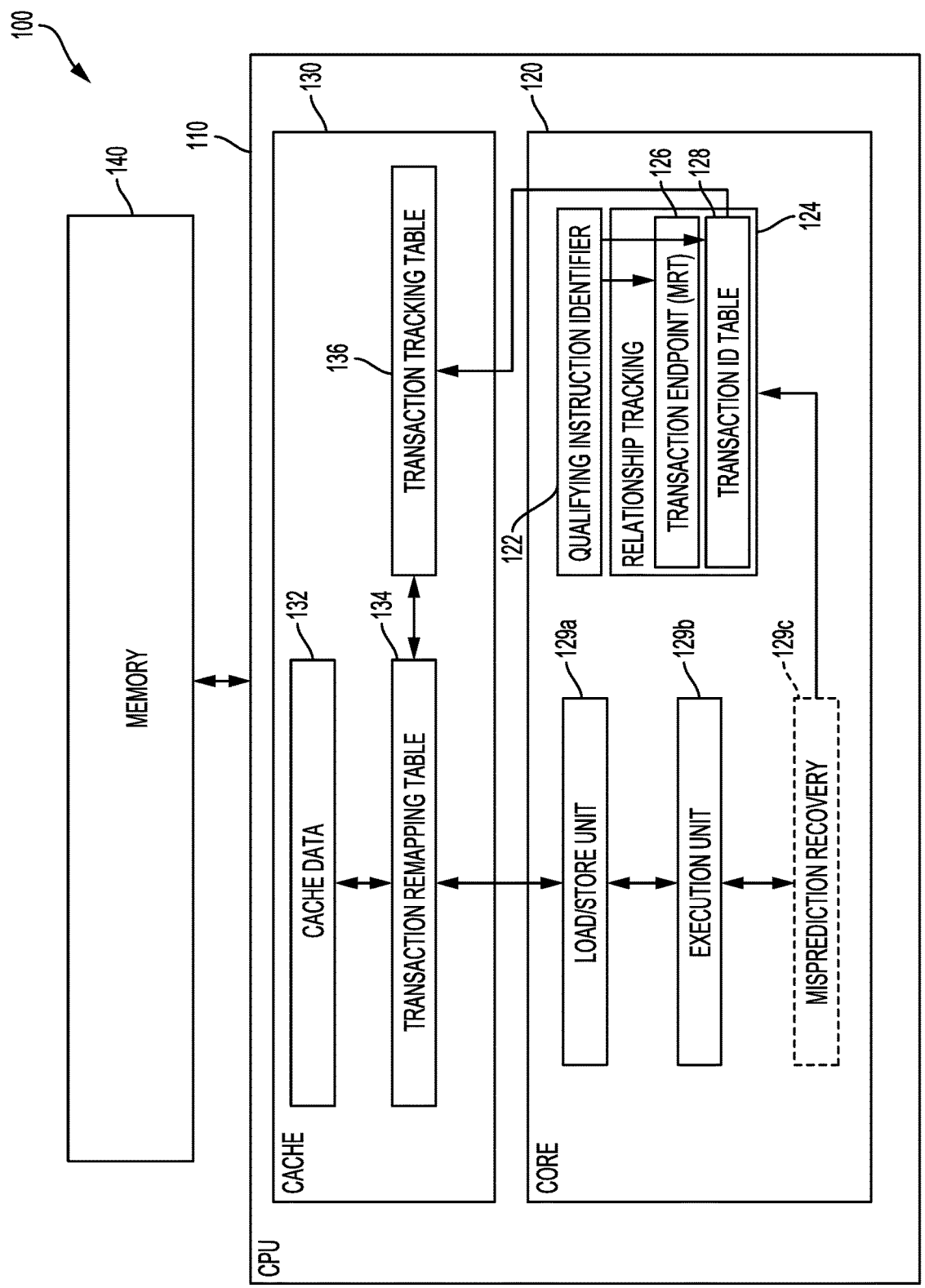
FIG. 1 shows a block diagram of a computing device configured to accelerate inversion of injective operations according to certain aspects of the present disclosure.

In this regard, in one aspect, FIG. 1 show a block diagram of a computing device 100 configured to accelerate inversion of injective operations. The computing device 100 comprises a CPU 110, and the CPU 110 further comprises a processing core 120 coupled to a cache 130. The processing core 120 comprises a qualifying instruction identifier block 122, relationship tracking block 124, a load/store unit 129a, an execution unit 129b, and in some aspects a misprediction recovery block 129c. The cache 130 comprises cache data 132 (which in some aspects may be instructions, data, or both), a transaction remapping table 134, and a transaction tracking table 136. In the context of the present disclosure, a transaction will be understood to mean a sequence of injective operations of arbitrary number, each of which may be reversed (i.e., has a known inverse operation, which may also be an injective operation but need not be). In a particular aspect, the CPU 110 may comprise at least one other processing core, and the cache 130 may be a shared cache that is coupled to processing core 120 and the other processing core, the other processing core also comprising a qualifying instruction identifier block and a relationship tracking block (not illustrated). The CPU 110 is further coupled to a memory system 140.

The processing core 120 may perform one or more injective operations, the results of which are written to the cache 130 and subsequently to the memory 140. In one aspect, the processing core 120 may then perform a context switch and the context-switched processing core 120 may perform the inverse of the one or more injective operations (or may be capable of supporting multiple contexts as in the case of a multi-threaded processor). Alternatively, in another aspect, the processing core 120 or the other processing core may perform the inverse of the one or more injective operations. In either case, in accordance with the teachings of the present disclosure, either the processing core 120, the context-switched processing core 120 or the other processing core, as part of performing the inverse operations, may retrieve the source values of the inverse operations directly from the cache 130 as the destinations of the original injective operations performed by the processing core 120 instead of performing memory and/or bus transactions to retrieve the source values for the inverse operations from the memory 140 or other memory system.

As will be explained further with reference to the following FIGS. 2-4, the qualifying instruction identifier block 122 is configured to identify instructions which may be injective operations. This may be accomplished in a variety of ways; in an exemplary aspect, the qualifying instruction identifier block 122 may be configured to always treat certain types of instructions (add/subtracts, rotates, loads/stores, and/or moves) as injective operations. In other aspects, the qualifying instruction identifier block 122 may be configured to recognize sequences of individual instructions that are all injective operations a single compound injective operation. Instructions that are identified by the qualifying instruction identifier block 122 as being injective operations will be tracked by the relationship tracking block 124. In one aspect, relationship tracking block 124 may comprise a transaction endpoint tracking table 126 (which may, in some aspects, be an already-existing structure such as a rename map table that is augmented to provide tracking for injective operations) and a transaction ID table 128 comprising information regarding the source(s) and destination(s) of a qualifying instruction (i.e., an instruction identified by the qualifying instruction identifier block 122 as an injective operation). As will be explained in greater detail with respect to FIGS. 2A-2D, the transaction endpoint tracking table 126 contains a mapping of a particular logical register to a particular transaction ID, and to the "depth" of that logical register with respect to the particular transaction, and the transaction ID table 128 contains a mapping of a particular transaction ID to a source (e.g., a memory location) and a sequence (up to the depth supported by the particular implementation) of operations related to that source.

The transaction tracking table 136 in the cache 130 is a superset of the transaction ID table 128 in the core 120. In addition to tracking a particular transaction ID, an associated source, and a sequence of operations related to that source, the transaction tracking table 136 also tracks the destination of that sequence of operations. Finally, the transaction remapping table 134 correlates a particular transaction with its reversing transaction by identifying sources and destinations in the transaction tracking table 136 that are generated from inverse operations and associating them with each other. Based on this association, the system 100 may then perform an accelerated action. In one aspect, the accelerated action may include prefetching data into the cache 130. In another aspect, the accelerated action may include providing data from the cache 130 to the core 120 based on the association and performing operations on the associated data received from the cache 130. In an aspect where the memory 140 is not a transactional memory, the CPU 110 confirms that the data provided by the cache 130 was correct, and if not, performs misprediction recovery in the core 120 by the misprediction recovery block 129c. In an aspect where the memory 140 is a transactional memory, the CPU 110 may be guaranteed that the data provided by the cache 130 is correct and may proceed with operations on that data without any need for potential misprediction recovery.

The transaction endpoint tracking table 126, transaction ID table 128, transaction remapping table 134, and transaction tracking table 136 can be designed to support an arbitrary number of injective operations in a sequence (i.e., an arbitrary transaction "depth"). However, those having skill in the art will recognize that there are trade-offs in choosing a particular number of injective operations to track as part of a transaction. The larger the number of injective operations tracked, the greater potential for being able to re-use previously generated values associated with the injective operations. However, the larger the number of injective operations tracked, the larger all of the supporting data structures and control logic must be (e.g., the transaction endpoint tracking table 126, transaction ID table 128, transaction remapping table 134, and transaction tracking table 136 all must become physically larger). Thus, those skilled in the art will recognize that the selection of the transaction depth in a particular implementation depends on likely behavior of expected workloads, available silicon area, timing constraints at design time, and other factors. Further, when the transaction ID table 128, the transaction remapping table 134, and transaction tracking table 136 are fully populated with entries, existing entries may be replaced by any replacement known to those having skill in the art.

FIGS. 2A-2D is a diagram of elements of the computing device during an exemplary acceleration of an inversion of injective operations according to certain aspects of the present disclosure. More specifically, FIGS. 2A-2D illustrate how the relationship tracking block 124 (including the transaction endpoint tracking table 126 and the transaction ID table 128), the transaction remapping table 134, and the transaction tracking table 136 are populated during an exemplary sequence of injective operations:

|   |   |
|---|---|
| LDR X3, [A] | (200a) |
| MOV X8, #3 | (200b) |
| ROR X5, X3, X8 | (200c) |
| STR X5, [B] | (200d) |
| LDR X2, [B] | (200e) |
| STR X2, [C] | (200f) |
| LDR X1, [C] | (200g) |
| STR X1, [D] | (200h) |
| LDR X4, [D] | (200i) |
| MOV X8, #3 | (200j) |
| ROR, X2, X4, X8 | (200k) |
| STR X2, [E] | (200l) |
| LDR X0, [E] | (200m) |

Figure 2A:
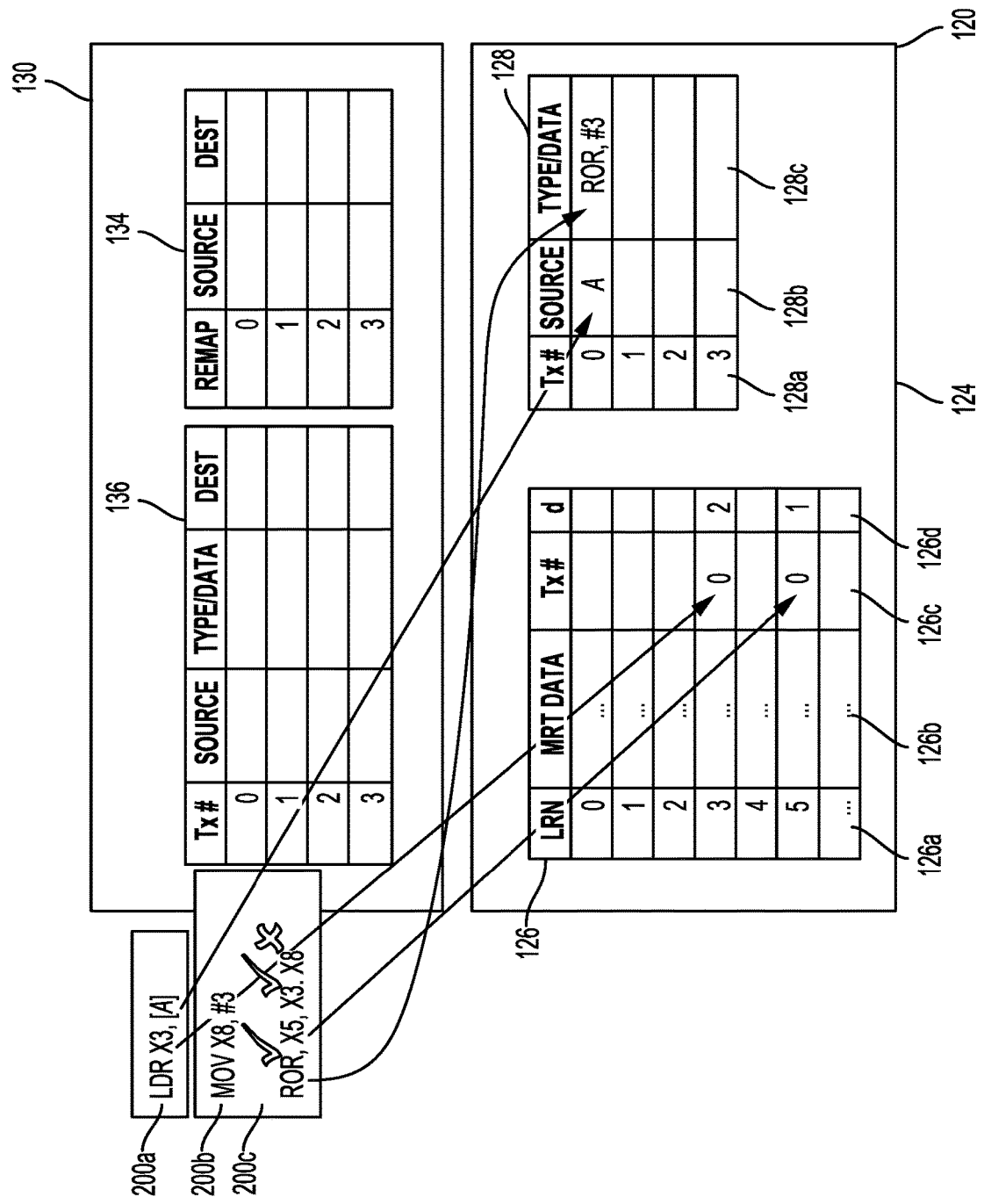
FIG. 2A shows a diagram of elements of the computing device during an exemplary acceleration of an inversion of injective operations according to certain aspects of the present disclosure.
Figure 2B:
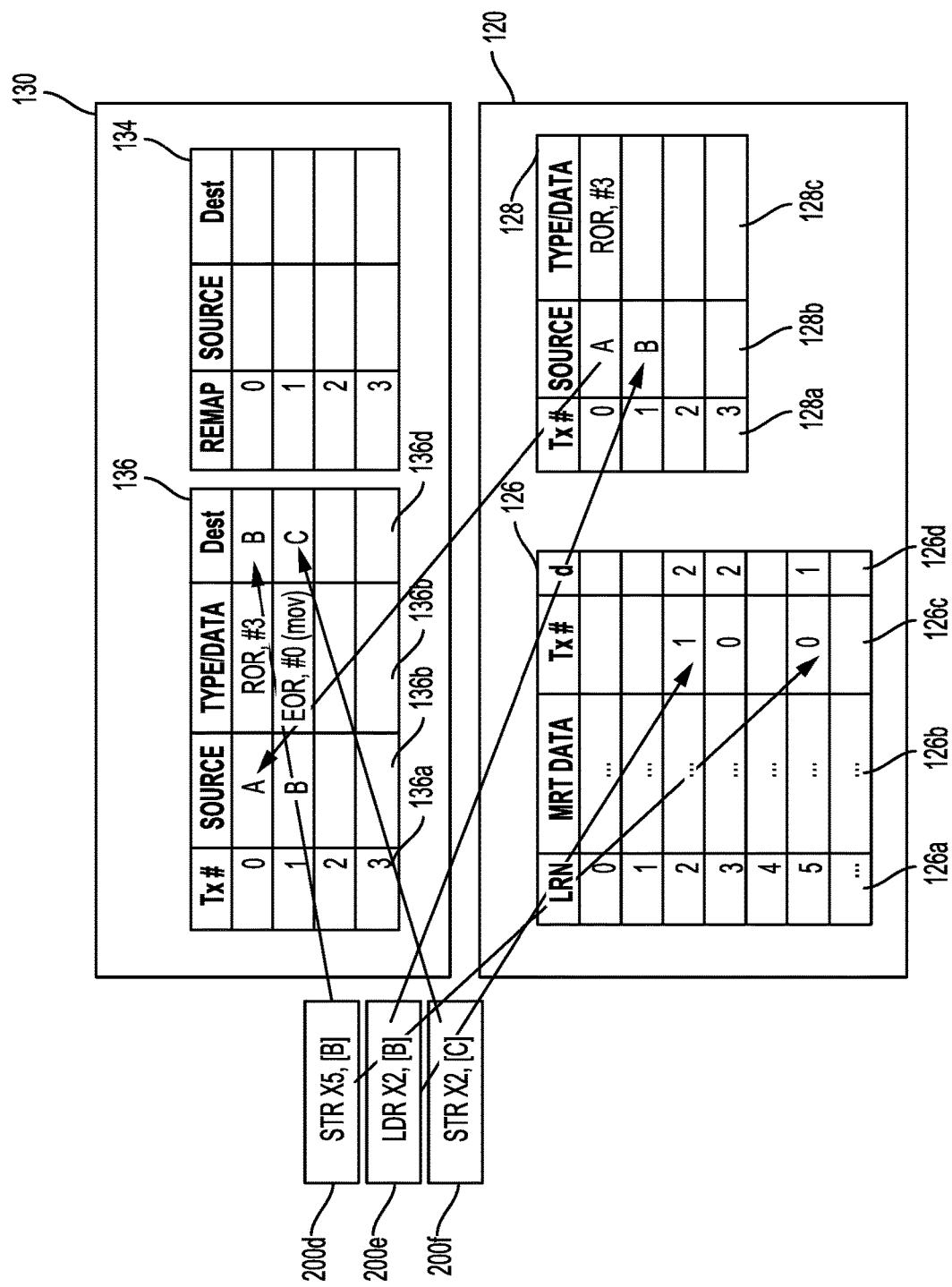
FIG. 2B shows a diagram of elements of the computing device during an exemplary acceleration of an inversion of injective operations according to certain aspects of the present disclosure.
Figure 2C:
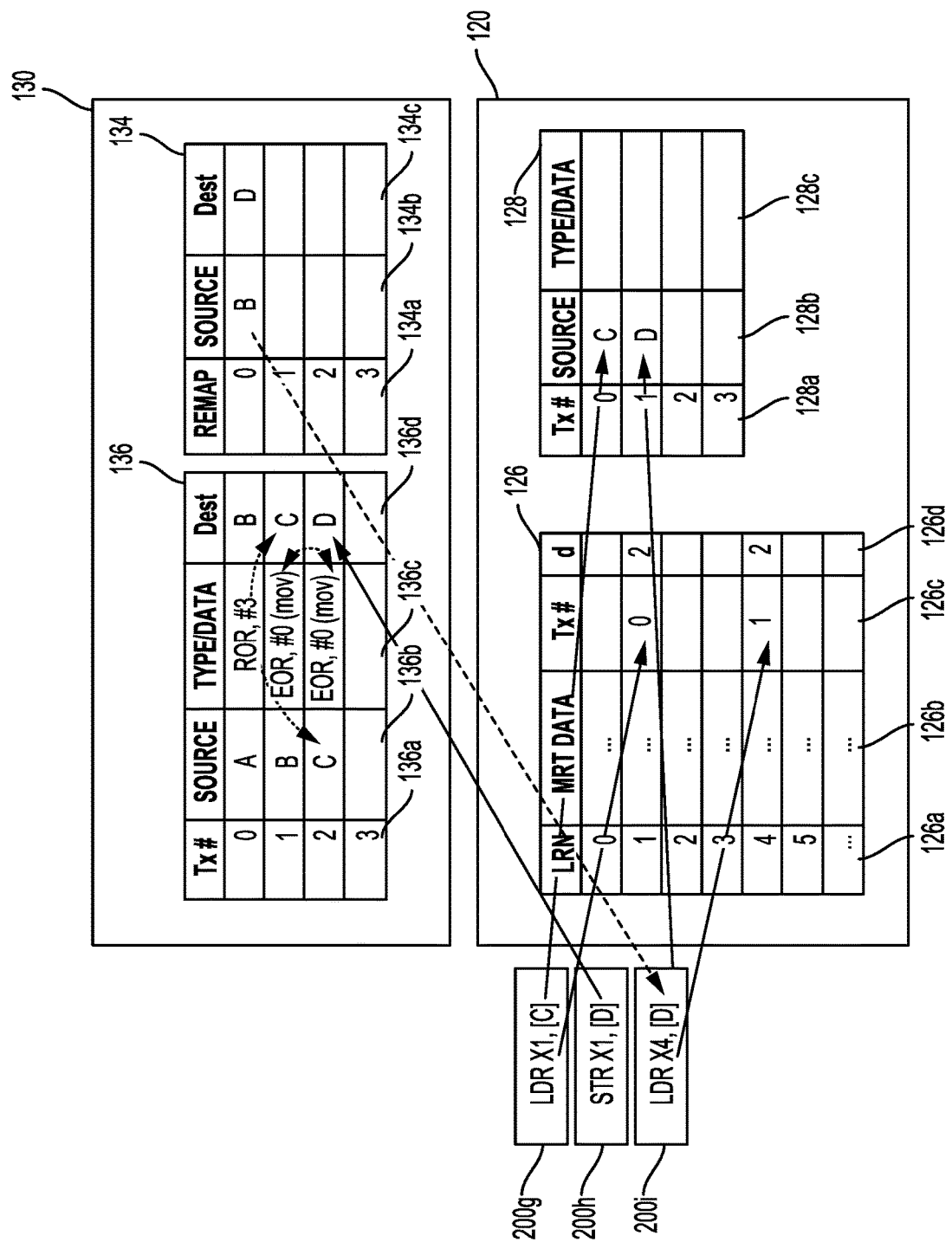
FIG. 2C shows a block diagram of elements of the computing device during an exemplary acceleration of an inversion of injective operations according to certain aspects of the present disclosure.
Figure 2D:
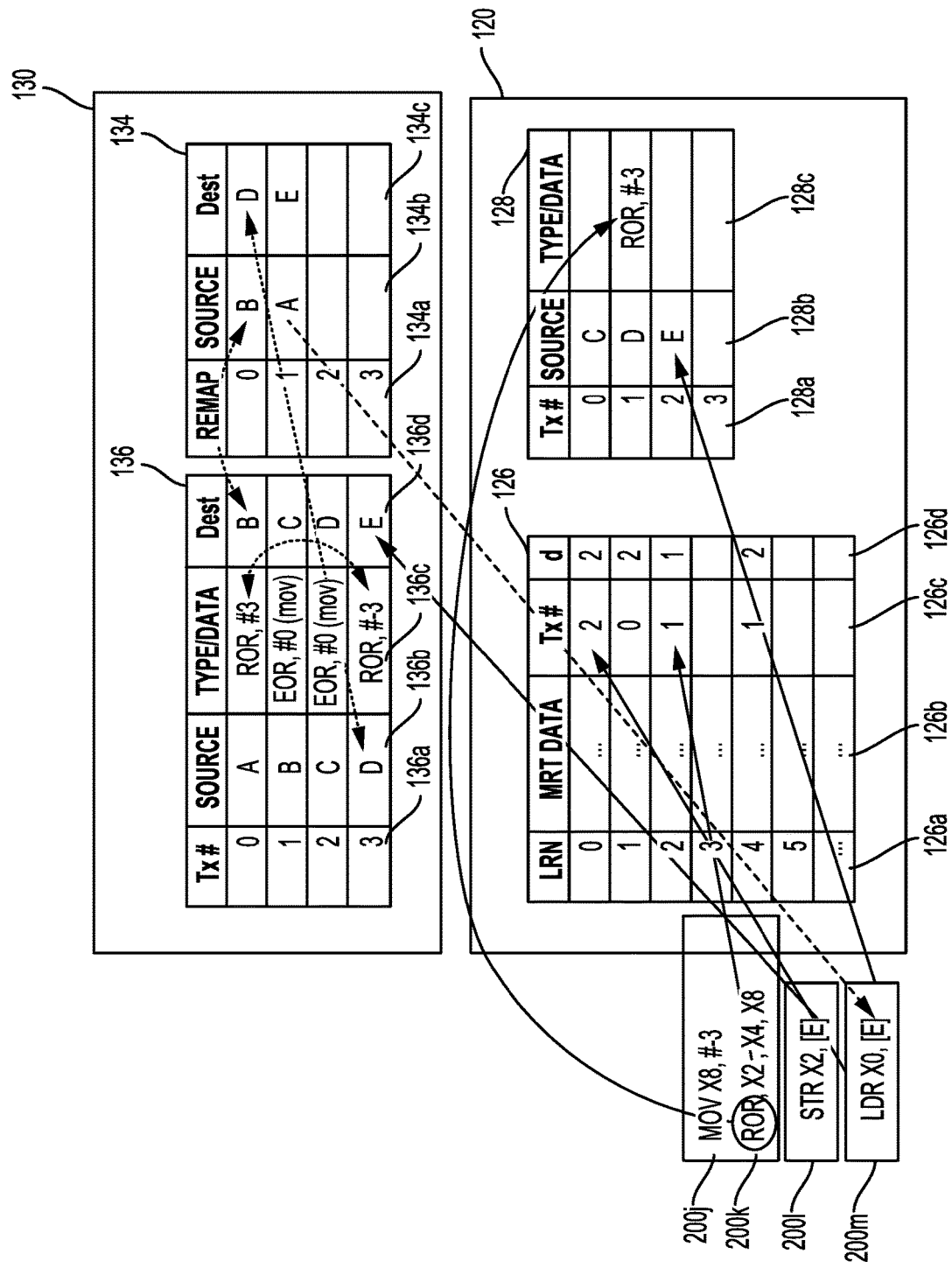
FIG. 2D shows a block diagram of elements of the computing device during an exemplary acceleration of an inversion of injective operations according to certain aspects of the present disclosure.

FIGS. 2A-2B illustrate a first set of injective operations performed by a processing core, for example, processing core 120 (instructions 200a-200f). FIGS. 2C-2D illustrate an inverse set of injective operations to the first set of injective operations performed by, in one aspect, the same processing core 120, in another aspect, the same processing core after a context switch, and in another aspect, by another processing core which shares the cache 130 with processing core 120 (instructions 200g-200m).

In a particular aspect, transaction endpoint tracking table 126 comprises a mapping rename table, which generally tracks the mapping of logical registers to physical structures. Thus, column 126a contains entries of logical register numbers, and column 126b contains entries showing the mapping of physical structures to those logical register numbers. In this particular aspect, the mapping rename table has been augmented with column 126c, which tracks a particular transaction ID associated with a logical register, and column 126d, which tracks the depth of a particular operation associated with a logical register in the associated transaction. In an aspect where, instead of augmenting and existing mapping rename table, a separate structure serving as a transaction endpoint tracking table 126 were provided, it would include the data from columns 126a, 126c, and 126d. Both of these aspects are contemplated as within the scope of this disclosure, as well as other variations occurring to one having skill in the art. Further, in the aspect illustrated in FIGS. 2A-2D, the transaction ID table 128 supports a transaction depth of 2. However, this depth is purely exemplary, and as discussed previously, those having skill in the art will readily understand that a different depth may be chosen depending on desired performance, design size, and other relevant factors.

In FIG. 2A, instruction 200a loads data from memory address [A] into register X3. Since a load instruction is a type of instruction that is considered an injective operation, it is identified as such by the qualifying instruction identifier block 122. Because instruction 200a is identified as an injective operation, and there are currently no injective operations being tracked by the transaction ID table 128, a source field in column 128b associated with transaction ID 0 in a transaction ID column 128a is populated with the source memory address [A], and the entry associated with register X3 in the transaction endpoint tracking table 126 is populated with any relevant information regarding associated physical structures (in column 126b), the associated transaction ID 0 in column 126c, and the relative depth of the identified injective operation within the associated transaction which is 2 (since it is the first injective operation of the associated transaction). Instruction 200b moves an immediate value of 3 into register X8. Then, instruction 200c performs a rotate of the value in register X3 (which was loaded from memory address [A] by the amount in register X8 (which is 3) and places the result into register X5. Since a rotate is also an injective operation, instruction 200c is identified as an injective operation by the qualifying instruction identifier block 122. Because instruction 200c is further identified as being related to transaction 0 (since it operates on the data loaded in the first instruction of transaction 0), the operation it performs is written into the field in column 128c associated with transaction 0 to indicate that the second operation of transaction 0 is a rotate-right by 3, and the entry associated with register X5 in the transaction endpoint tracking table 126 is populated with the associated transaction ID 0 in column 126c, and the relative depth of the rotate-right operation within transaction ID 0, which is 1, in column 126d.

In FIG. 2B, instruction 200d stores the value from register X5 into memory location [B]. Since register X5 is associated with a valid transaction ID (transaction 0), when the write to memory location [B] is performed in the cache 130, the core 120 also provides information from the transaction ID table 128 back to the cache 130 about transaction 0 so that the cache 130 can update the transaction tracking table 136. Specifically, the transaction tracking table 136 is updated by associating transaction 0 of column 136a with having a source of memory location [A] in column 136b, performing a rotate-right by 3 in column 136c, and having a destination of memory location [B] in column 136d. Instruction 200e loads the value from memory location [B] into register X2. Thus, instruction 200e is identified as an injective operation, the source field column 128b associated with transaction 1 is populated with the source memory address [B], and the entry associated with register X2 in the transaction endpoint tracking table 126 is populated with the associated transaction ID 1 in column 126c, and the relative depth 2 in column 126d. Instruction 200f stores the value in register X2 to memory location [C]. Since register X2 is associated with a valid transaction ID (transaction 1), when the write to memory location [C] is performed in the cache 130, the core 120 also provides the associated information from the transaction ID table 128 so that the cache 130 can update the transaction tracking table 136. The transaction tracking table 136 is updated by associating transaction 1 of column 136a with having a source of memory location [B] in column 136b, performing a move operation in column 136c (because field 128c of transaction ID 1 in the transaction ID table 128 was not populated, a particular embodiment may assume that the operation was a move), and having a destination of memory location [C] in column 136d.

In FIG. 2C, instruction 200g loads the value from memory location [C] into register X1. Instruction 200g is an injective operation, and transaction ID table 128 is not tracking any injection operations. Thus, a source field in column 128b associated with transaction ID 0 in a transaction ID column 128a is populated with the source memory address [C], and the entry associated with register X1 in the transaction endpoint tracking table 126 is populated with the associated transaction ID 0 in column 126c, and the relative depth 2 in column 126d. Instruction 200h stores the value from register X1 into memory address [D]. Because register X1 is associated with a valid transaction ID (transaction 0), when the write to memory location [D] is performed in the cache 130, the core 120 also provides information from the transaction ID table 128 so that the cache 130 can update the transaction tracking table 136. The transaction tracking table 136 is updated by associating transaction 2 of column 136a with having a source of memory location [C] in column 136b, performing a move operation in column 136c, and having a destination of memory location [D] in column 136d. In addition, the cache 130 determines that transaction 2 is the inverse of transaction 1 in the transaction tracking table 136, since the destination of transaction 1 and the source of transaction 2 are the same, the operation performed by transaction 1 is injective, and the operation performed by transaction 2 is the inverse of transaction 1 (a move operation does not change the actual data value, and is thus an injective operation and its own inverse). In response to this determination, entry 0 (in column 134a) of the transaction remapping table 134 is populated with source memory location [B] in column 134b and destination memory location [D] in column 134c. This entry indicates that a future instruction that requests the data from memory location [D] may be able to use the data from memory location [B], which has already been produced. Instruction 200i loads the value from memory location [D] into register X4. Instruction 200i is identified as an injective operation, and there are available transaction IDs in the transaction ID table 128. Thus, the source field in column 128 associated with transaction ID 1 (which is the next available transaction ID) is populated with the source memory address [D], and the entry associated with register X4 in the transaction endpoint tracking table 126 is populated with the associated transaction ID 1 in column 126c, and the relative depth of 2 in column 126d.

In FIG. 2D, instruction 200j moves an immediate value of 3 into register X8. Instruction 200k performs a rotate of the value in register X4 (which was loaded from memory address [D]) by the amount in register X8 (which is 3), and places the result into register X2. Because instruction 200k is a rotate, it is identified as an injective operation by the qualifying instruction identifier block 122, and it is further identified as being related to transaction 1, since it operates on data loaded in the first instruction of transaction 1. Thus, the operation performed by instruction 200k is written into the field in column 128c associated with transaction 1, and the entry associated with register X2 in the transaction endpoint tracking table 126 is populated with the associated transaction ID 1 in column 126c, and the relative depth of 1 in column 126d. Instruction 200l stores the value in register X2 to memory location [E]. Since register X2 is associated with a valid transaction ID (transaction 1), when the write to memory location [E] is performed in the cache 130, the core 120 also provides the associated information from the transaction ID table 128 so that the cache 130 can update the transaction tracking table 136. The transaction tracking table 136 is updated by associating transaction 1 of column 136a with having a source of memory location [D] in column 136b, performing a rotate-right by 3 operation in column 136c, and having a destination of memory location [E] in column 136d. Additionally, the cache 130 now determines that the source of transaction 0 in the transaction remapping table 134 matches the destination of transaction 1 in the transaction tracking table 136, the destination of transaction 0 in the transaction remapping table 134 matches the source of transaction 3 in the transaction tracking table 136, and the operations performed by transactions 0 and 3 in the transaction tracking table are injective inverses of each other. In response to this determination, the entry for transaction 1 in column 134a of the transaction remapping table 134 is populated with memory location [A] as the source in column 134b and memory location [E] as the destination in column 134c. This entry indicates that a future instruction that requests data from memory location [E] may be able to use the data from memory location [A], which has already been produced. For example, instruction 200m loads the value from memory location [E] into register X0. However, because the remapping table entry 1 contains a mapping of memory location [E] to memory location [A], the cache 130 may be able to return the data in memory location [A] instead of waiting on a longer-latency operation to return the data in memory location [E] from memory 140, for example.

Although FIGS. 2A-2D have illustrated the case where instructions 200a-200f have been performed by the processing core 120, and instructions 200f-200m have been performed by either another processing core, or by the processing core 120 after a context switch, as discussed above, those having skill in the art will understand that all of instructions 200a-200m may be performed by the processing core 120, and the processing core 120 may still be capable of accelerating actions as described herein. Specifically, the transaction ID table 128 may be further configured to store destinations of operations (just as the transaction tracking table 136 does as illustrated), and may be configured to identify the same types of relationships between transactions as the cache 130 does in the above description.

Figure 3:
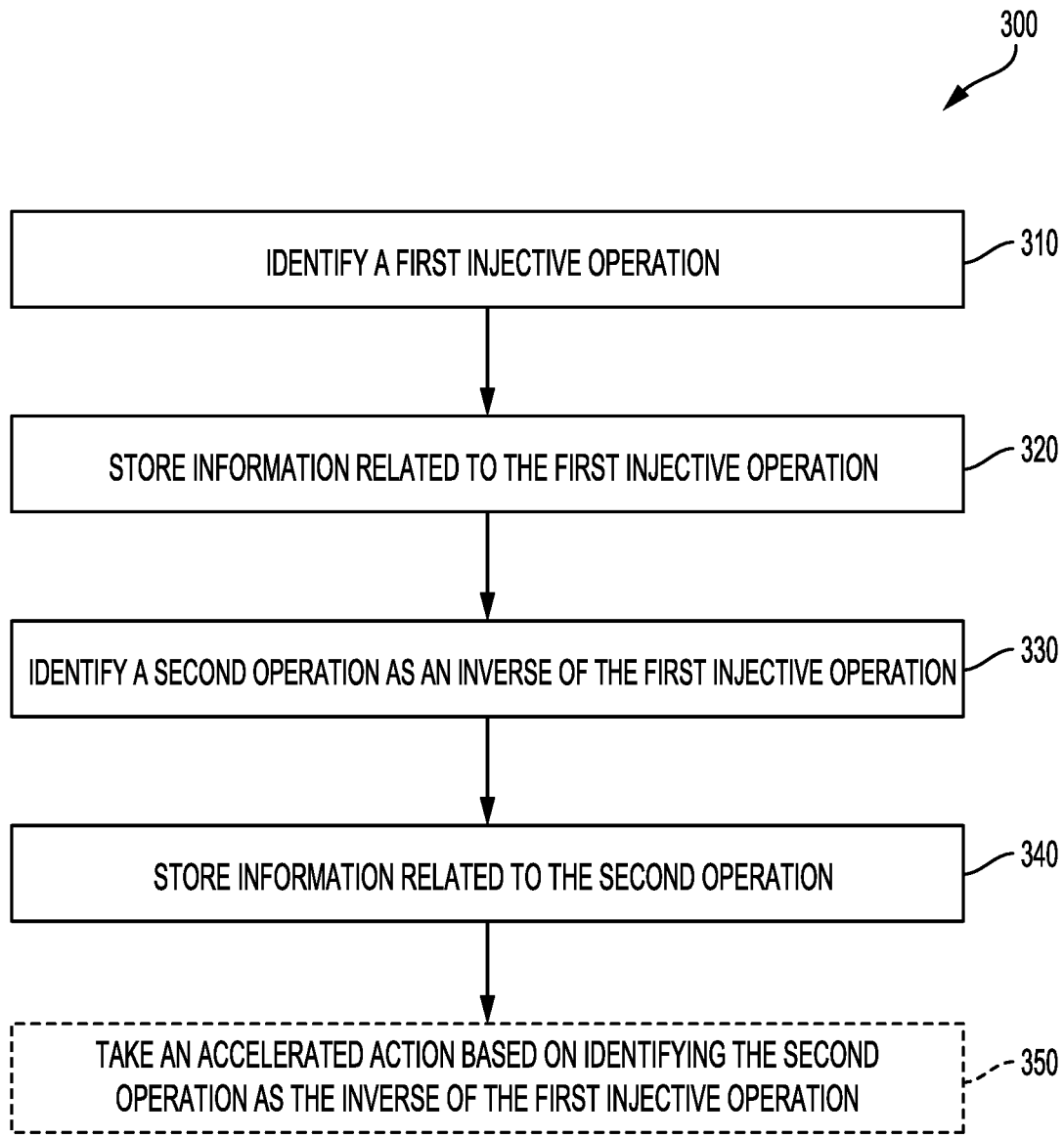
FIG. 3 shows a block diagram of a method of accelerating an inversion of injective operations according to certain aspects of the present disclosure.

FIG. 3 shows a block diagram of a method 300 of accelerating an inversion of injective operations according to certain aspects of the present disclosure. The method 300 begins at block 310, where a first injective operation is identified. As discussed with reference to FIGS. 1 and 2A-2D, this may be by the qualifying instruction identifier 122, and the injective operation may be one of a defined class of instructions that are known to be injective. The method 300 continues at block 320, where information related to the first injective operation is stored. As discussed with reference to FIGS. 2A and 2B, this may involve associating the first injective operation with a transaction ID and a depth, and storing information regarding the source, destination, and type of the injective operation in the transaction endpoint tracking table 126 and the transaction ID table 128 in the core 120, transaction remapping table 134 and transaction tracking table 136 in the cache 130.

The method 300 continues at block 330, where a second operation that is an inverse of the first injective operation is identified. The second operation may be injective, but need not be, so long as the first operation of which it is the inverse was an injective operation. The method 300 continues at block 340, where information related to the second operation is stored. As discussed with reference to FIGS. 2C and 2D, this may involve associating the second operation with a transaction ID and a depth, and storing information regarding the source, destination, and type of the injective operation in the transaction endpoint tracking table 126 and the transaction ID table 128 in the core 120, transaction remapping table 134 and transaction tracking table 136 in the cache 130.

The method 300 may further include, at block 350, taking an accelerated action based on identifying the second operation as the inverse of the first injective operation. As discussed with reference to FIGS. 2C and 2D, this may involve identifying that the destination of the first injective operation and the source of the second operation are the same, and that the type of operation of the second operation is the inverse of the first injective operation (or that the data is otherwise unchanged by the operation, e.g., in the case of a simple move, load, or store operation that does not transform the underlying data). Regarding the accelerated action, the core 120 may pre-load data into its cache 130 in response to identifying the second operation. Alternatively, the core 120 may execute (either speculatively, or non-speculatively if the memory 140 associated with the core 120 is a transactional memory) instructions using data value(s) generated by the first injective operations that are already located in the cache 130, instead of waiting to retrieve those value from the memory 140.

An example apparatus in which aspects of this disclosure may be utilized will now be discussed in relation to FIG. 4. FIG. 4 shows a diagram of a computing device 400 incorporating one or more aspects of the computing device configured to accelerate inversion of injective operations 100 of FIG. 1. The computing device 400 includes the memory 140, coupled to the cache 130 and the core 120. As discussed with reference to the previous figures, the core 120 may be context-switchable. Alternatively, the computing device 400 may include another processing core 120-2, substantially identical to the core 120 and sharing access to the cache 130. The core 120 and/or the core 120-2 may be configured in accordance with FIGS. 1 and 2A-2D, and may be configured to perform the method of FIG. 3. The memory 404 may further store non-transitory computer-readable instructions that, when executed by the processor 102, may perform the method 300 of FIG. 3.

Figure 4:
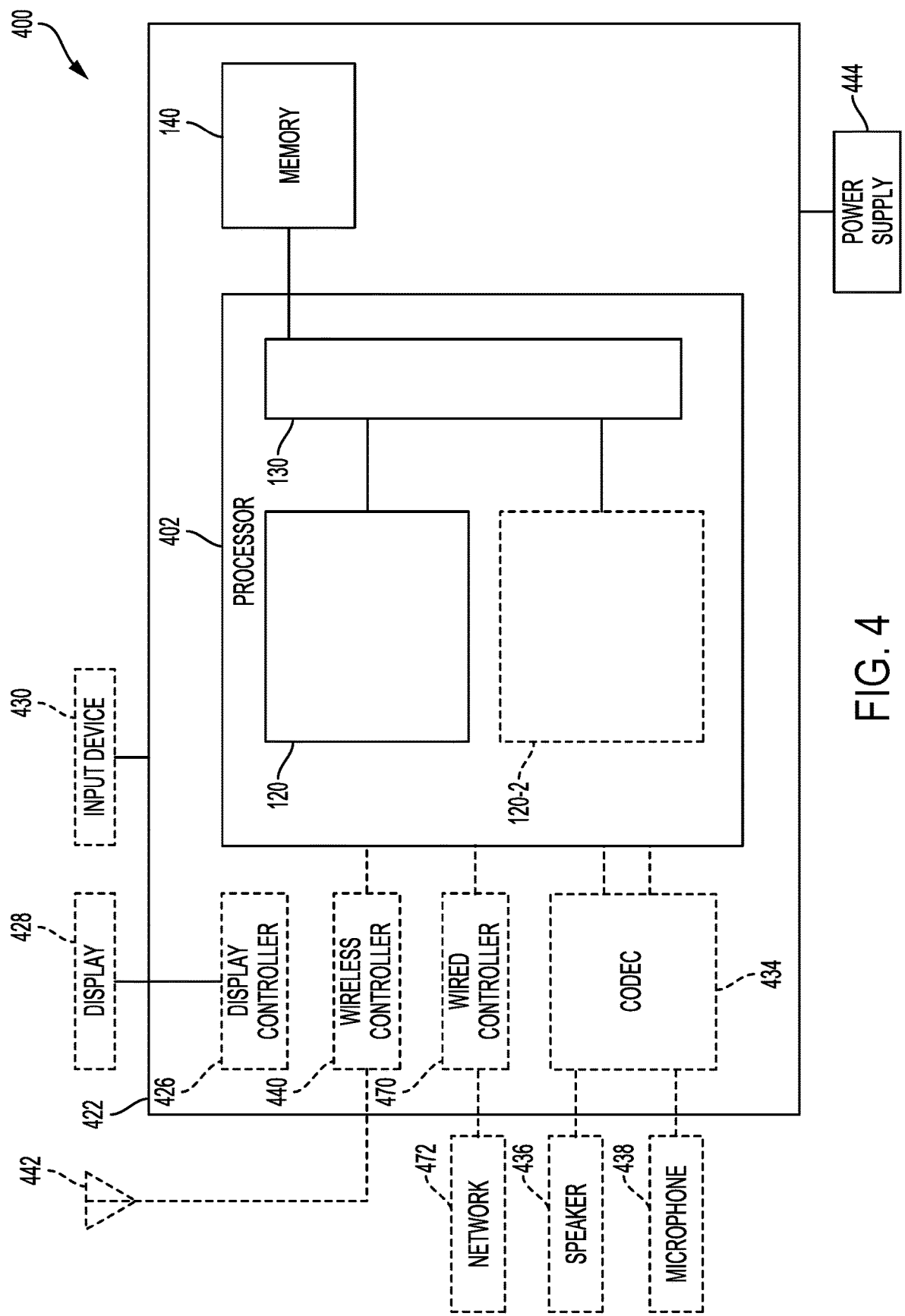
FIG. 4 shows a system-level diagram of a computing device including blocks implementing acceleration of an inversion of injective operations according to certain aspects of the present disclosure.

FIG. 4 also shows optional blocks in dashed lines, such as coder/decoder (CODEC) 434 (e.g., an audio and/or voice CODEC) coupled to processor 402 and speaker 436 and microphone 438 can be coupled to CODEC 434; and wireless antenna 442 coupled to wireless controller 440 which is coupled to processor 402. Further, the system 402 also shows display controller 426 that is coupled to processor 402 and to display 428, and wired network controller 470 coupled to processor 402 and to a network 472. Where one or more of these optional blocks are present, in a particular aspect, processor 402, display controller 426, memory 432, and wireless controller 440 may be included in a system-in-package or system-on-chip device 422.

Accordingly, a particular aspect, input device 430 and power supply 444 are coupled to the system-on-chip device 422. Moreover, in a particular aspect, as illustrated in FIG. 4, where one or more optional blocks are present, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 generally depicts a computing device, processor 402 and memory 404, may also be integrated into a mobile phone, a communications device, a computer, a server, a laptop, a tablet, a personal digital assistant, a music player, a video player, an entertainment unit, and a set top box, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method, comprising:
identifying a first operation as an injective operation;
storing transaction information related to the first operation, wherein storing transaction information related to the first operation comprises associating a destination register of the first operation with a transaction ID and a transaction depth;
identifying a second operation as an inverse of the first operation; and
storing transaction information related to the second operation.

2. The method of claim 1, wherein the injective operation is one of an add, subtract, load, store, rotate, or move operation.

3. The method of claim 1, wherein storing transaction information related to the first operation further comprises:
associating the transaction ID with a source memory location and a type of the first operation; and
associating a source of the first operation with the type of the first operation and a destination memory location.

4. The method of claim 3, wherein storing transaction information related to the second operation comprises:
associating a destination register of the second operation with a transaction ID and a transaction depth;
associating the transaction ID with a source memory location and a type of the second operation; and
associating a source of the second operation with the type of the second operation and a destination memory location.

5. The method of claim 4, wherein identifying that the second operation is the inverse of the first operation comprises:
identifying that the destination memory location of the first operation matches the source memory location of the second operation; and
determining that the type of the first operation is an inverse of the type of the second operation.

6. A method, comprising:
identifying a first injective operation;
storing information related to the first injective operation;
identifying a second operation as an inverse of the first injective operation;
storing information related to the second operation; and
taking an accelerated action based on identifying the second operation as an inverse of the first injective operation.

7. The method of claim 6, wherein the accelerated action includes preloading a cache with data.

8. The method of claim 6, wherein the accelerated action includes performing operations using data associated with the first injective operation.

9. The method of claim 8, further comprising performing the operations speculatively, determining if the operations were performed in error, and performing misprediction recovery if the operations were performed in error.

10. An apparatus, comprising:
a processing core; and
a cache memory coupled to the processing core,
the processing core further comprising:
a qualifying instruction identifier configured to identify injective operations and inverse operations; and
a relationship tracking block configured to store information related to an identified operation,
the cache memory further comprising:
a transaction remapping table configured to store information related to identified operations; and
a transaction tracking table configured to identify and associate pairs of injective operations and inverse operations.

11. The apparatus of claim 10, wherein the processing core is context-switchable or supports multiple contexts.

12. The apparatus of claim 10, further comprising a second processing core coupled to the cache memory, the second processing core comprising a second qualifying instruction identifier configured to identify injective operations and a relationship tracking block configured to store information related to an identified injective operation.

13. The apparatus of claim 10, wherein the relationship tracking block comprises:
a transaction endpoint tracking table configured to associate a destination register of an operation with a transaction ID and a transaction depth; and
a transaction ID table configured to associate a transaction ID with a source memory location and a type of an operation.

14. The apparatus of claim 10, wherein:
the transaction remapping table is configured to associate a cache transaction ID with a source memory location, a destination memory location, and an operation type; and
the transaction tracking table is configured to identify and associate injective operations and inverse operations from the transaction remapping table.

15. The apparatus of claim 10, wherein the transaction tracking table is configured to identify and associate operations from the transaction remapping table by identifying a first transaction having a first memory location as a destination memory location, identifying a second transaction associated having the first memory location as a source memory locations, and identifying that a second operation type of the second transaction is an inverse of a first operation type of the first transaction.

16. The apparatus of claim 15, wherein the cache memory is configured to preload information based on the transaction tracking table identifying the first transaction and the second transaction as inverse operations.

17. The apparatus of claim 15, wherein the processing core is configured to execute operations using data associated with the first transaction based on the transaction tracking table identifying the first transaction and the second transaction as inverse operations.

18. The apparatus of claim 17, further comprising a misprediction recovery block, and wherein the processing core is configured to execute operations using data generated by the first transaction in a speculative manner, and if the operations are determined to have been performed in error, the misprediction recovery block is configured to perform misprediction recovery.

19. The apparatus of claim 17, wherein the memory is a transactional memory.

20. The apparatus of claim 10, integrated into a computing device.

21. The apparatus of claim 20, the computing device further integrated into a device selected from the group consisting of a mobile phone, a communications device, a computer, a server, a laptop, a tablet, a personal digital assistant, a music player, a video player, an entertainment unit, and a set top box.

22. An apparatus, comprising:
means for processing;
means for caching coupled to the means for processing,
the means for processing further comprising:
   means for identifying a qualifying instruction configured to identify injective operations and inverse operations; and
   means for tracking relationship information configured to store information related to an identified operation,
the means for caching further comprising:
   means for storing transaction remapping information configured to store information related to identified operations; and
   means for storing transaction tracking information configured to identify and associate pairs of injective operations and inverse operations.

\* \* \* \* \*